United States Patent
Schumann et al.

(10) Patent No.: US 10,921,457 B2
(45) Date of Patent: Feb. 16, 2021

(54) METHOD AND DEVICE FOR DETECTING A FAULT OF A BAROMETRIC PRESSURE MEASURING SYSTEM ARRANGED ABOARD A FLYING DEVICE

(71) Applicant: Deutsches Zentrum für Luft- und Raumfahrt e.V., Cologne (DE)

(72) Inventors: Ulrich Schumann, Herrsching (DE); Carsten Christmann, Gifhorn (DE); Andreas Giez, Landsberg am Lech (DE)

(73) Assignee: Deutsches Zentrum für Luft- und Raumfahrt e.V., Cologne (DE)

(*) Notice: Subject to any disclaimer, the term of this patent is extended or adjusted under 35 U.S.C. 154(b) by 57 days.

(21) Appl. No.: 16/090,450

(22) PCT Filed: Feb. 14, 2017

(86) PCT No.: PCT/EP2017/053300
§ 371 (c)(1),
(2) Date: Oct. 1, 2018

(87) PCT Pub. No.: WO2017/174238
PCT Pub. Date: Oct. 12, 2017

(65) Prior Publication Data
US 2019/0120968 A1    Apr. 25, 2019

(30) Foreign Application Priority Data
Apr. 5, 2016  (DE) .......................... 102016106221.9

(51) Int. Cl.
G01S 19/15 (2010.01)
G01S 19/42 (2010.01)
(Continued)

(52) U.S. Cl.
CPC .............. G01S 19/15 (2013.01); G01C 5/06 (2013.01); G01S 19/42 (2013.01); *G01C 21/20* (2013.01)

(58) Field of Classification Search
CPC .......... G01S 19/15; G01S 19/42; G01S 19/48; G01S 19/04; G01S 19/45; G01C 5/06; G01C 5/0263; G01C 15/004
(Continued)

(56) References Cited

U.S. PATENT DOCUMENTS 6,735,542 B1    5/2004 Burgett et al.
6,970,795 B1   11/2005 Burgett et al.
(Continued)

FOREIGN PATENT DOCUMENTS

| | | |
|---|---|---|
| EP | 2778604 A1 | 9/2014 |
| FR | 2988833 A1 | 10/2013 |
| WO | WO 98/43045 | 10/1998 |

OTHER PUBLICATIONS

Blanchard, R.L., "A New Algorithm for Computing Inertial Altitude and Vertical Velocity", IEEE Transactions on Aerospace and Electronic Systems, vol. AES-7, No. 6, Nov. 1971.
(Continued)

*Primary Examiner* — Harry K Liu
(74) *Attorney, Agent, or Firm* — Hoffmann & Baron, LLP (57) ABSTRACT

Method and device to determine fault of a pressure measuring system aboard a flying device, the system determining static pressure $p_{AC}(t)$ and/or barometric altitude $z_{AC}(t)$. The method includes: determining position $POS_{GNSS}(t)$ and altitude $z_{GNSS}(t)$ of the flying device at time t using satellite navigation system GNSS; determining a geopotential altitude $z_{AN/PROG}(t)$ related to $p_{AC}(t)$ for position $POS_{GNSS}(t)$ in data $AN_{DAT}$ or in data $PROG_{DAT}$ of prediction model (NWP); and/or determining static pressure $p_{AN/PROG}(t)$
(Continued)

related to $z_{GNSS}(t)$ for $POS_{GNSS}(t)$ in $AN_{DAT}$ or $PROG_{DAT}$; determining altitude deviation $\Delta z(t)=z_{GNSS}(t)-z_{AN/PROG}(t)$ and/or pressure deviation $\Delta p(t)=p_{AC}(t)-p_{AN/PROG}(t)$; determining altitude deviation $\Delta z^*$ averaged over time $\Delta t$ from $\Delta z(t)=z_{GNSS}(t)-z_{AN/PROG}(t)$ and/or pressure deviation $\Delta p^*$ averaged over time $\Delta t$ from $\Delta p(t)=p_{AC}(t)-p_{AN/PROG}(t)$; and generating a warning signal if a fault of the system is detected, the fault detected if $|\Delta z^*|>G1$, or $|\Delta p^*|>G2$.

21 Claims, 3 Drawing Sheets (51) Int. Cl.
G01C 5/06 (2006.01)
G01C 21/20 (2006.01)
(58) Field of Classification Search
USPC .................................................. 342/357.28
See application file for complete search history.

(56) References Cited

U.S. PATENT DOCUMENTS

| | | | |
|---|---|---|---|
| 9,243,906 B1 | 1/2016 | Conrad et al. | |
| 2004/0068372 A1* | 4/2004 | Ybarra | G05D 1/0607 |
| | | | 701/301 |
| 2009/0189787 A1* | 7/2009 | Khatwa | G08G 5/0021 |
| | | | 340/970 |
| 2010/0052978 A1* | 3/2010 | Tillotson | G01S 13/88 |
| | | | 342/26 B |
| 2010/0066565 A1* | 3/2010 | Francois | G06F 9/4881 |
| | | | 340/963 |
| 2013/0133421 A1 | 5/2013 | Katz | |
| 2013/0226375 A1* | 8/2013 | Peter | G01C 5/06 |
| | | | 701/10 |
| 2014/0114624 A1 | 4/2014 | Buchanan et al. | |
| 2014/0135040 A1 | 5/2014 | Edge et al. | |
| 2014/0174175 A1 | 6/2014 | Chun et al. | |
| 2014/0278182 A1 | 9/2014 | Garcia et al. | |
| 2015/0054664 A1 | 2/2015 | Dupont De Dinechin | |
| 2015/0247917 A1 | 9/2015 | Gum et al. | |
| 2016/0047648 A1 | 2/2016 | Edge et al. | |

OTHER PUBLICATIONS

Zaliva, Vadim, et al., "Barometric and GPS Altitude Sensor Fusion", IEEE International Conference on Acoustic, Speech and Signal Processing (ICASSP), 2014.

Pfeffer, Gerd, "Fliegen im Gebirge", http://www.gerd-pfeffer.de/downloads.html, 2004.

English translation of the International Preliminary Report on Patentability dated Oct. 18, 2018 for International Application No. PCT/EP2017/053300.

Search Report and Written Opinion issued in French Application No. FR 1753190 dated Jun. 24, 2019.

* cited by examiner

METHOD AND DEVICE FOR DETECTING A FAULT OF A BAROMETRIC PRESSURE MEASURING SYSTEM ARRANGED ABOARD A FLYING DEVICE

CROSS-REFERENCE TO RELATED APPLICATIONS

This application is the U.S. National Phase of International Patent Application No. PCT/EP2017/053300, filed on 14 Feb. 2017, which claims benefit of German Patent Application No. 102016106221.9, filed on 5 Apr. 2016, the contents of which are incorporated herein by reference in their entirety.

BACKGROUND

Field

The invention relates to a method and device for determining a fault of a barometric pressure measuring system arranged aboard a flying device.

Related Art

The barometric pressure measuring system of a flying device is particularly used to determine the barometric altitude $z_{AC}(t)$ (=pressure level) of the flying device, which is determined based on the static pressure $p_{AC}(t)$ at the flight level of the flying device in the undisturbed atmosphere. For this purpose, the static pressure $p_{AC}(t)$ is determined during the flight. Pressure is taken from a suitable point on the surface of the flying device (the "static pressure tapping point"), and the pressure taken from there is measured using respective pressure sensors. This pressure measurement is disturbed by the aerodynamics of the flying device and the current configuration of the flying device, for example as a function of air speed (such as the Mach number).

The altitude of a flying device is typically determined from measuring the static air pressure $p_{AC}(t)$ and converting it to a barometric altitude $z_{AC}(t)$ based on the ICAO standard atmosphere (ICAO: "International Civil Aviation Organization"). Depending on current weather conditions, the status of the local atmosphere can deviate considerably from the ICAO standard atmosphere, and so the barometric altitude $z_{AC}(t)$ of the flying device can deviate from an actual geometric altitude of the flying device. The deviations of the barometric altitude $z_{AC}(t)$ typically are about +/−5 to 10% of the geometric altitude.

The barometric altitude $z_{AC}(t)$ can thus be determined using the barometric pressure measuring system on the flying device without external aids and is thus traditionally the basis of flight control. Measuring errors due to the disturbances mentioned above and the accuracy of the barometric altitude $z_{AC}(t)$ determined would be unacceptable if it were not for the calibration of the barometric pressure measuring system. For an exact determination of the barometric altitude, the deviation of an actual pressure measurement from the conditions of the surrounding undisturbed atmosphere must be known and corrected accordingly.

When a flying device is licensed, a multitude of calibration measurements are performed on the ground and in flight for calibrating the installed barometric pressure measuring system. The measured values of the sensors of the barometric pressure measuring system on a prototype of the flying device are typically compared to measurements in an undisturbed environment at the same altitude. The pressure tapping fault, which is used for correction in the form of various influencing variables, is determined from the difference. This correction is typically determined uniformly for a specific flying device type and stored in an air data system (ADS). Other relevant data in addition to pressure measurement are provided to the air data system as well.

This correction of pressure measurement is typically determined by comparing measured results of the barometric pressure measuring system and reference measurements, e.g., at a tower or so-called "tower flyby" or measurements of a comparison flying device calibrated accordingly or measurements of the static air pressure in the undisturbed atmosphere far ahead (e.g., using a sensor on a nose boom of the flying device) or behind the flying device (e.g., using a trailing probe with trailing cone, so-called trailing cone measurement).

Sufficiently accurate calibration of the barometric pressure measuring system is particularly important if the flying device is to be operated in an air space with reduced vertical separation, such as an air space where "reduced vertical separation minima, RVSM" apply. Flights in such an air space with reduced vertical separation (RVSM air spaces) are only permissible if the flying device has been granted an RVSM operating license from the competent aviation authority. It must be demonstrated for this purpose that the barometric pressure measuring system allows the determination of a barometric altitude $z_{AC}(t)$ with a specified accuracy under specified conditions in the area of use of the flying device.

Today, determining the required pressure correction in the barometric pressure measuring system requires complex flight tests of the flying device to be tested, measurements on the ground, accompanying measurements during the flight, or the availability of additional experimental equipment on the flying device.

A known method for determining the barometric altitude $z_{AC}(t)$ in flight is the so-called "Blanchard method". In this method, the pressure difference between various altitudes is determined from the integral of the virtual temperature and corrected using the pressure gradient due to the geostrophic wind (see: Blanchard, R. L., "*An Improvement to an Algorithm for Computing Aircraft Reference Altitude*", IEEE Transactions on Aerospace and Electronic Systems, Vol. AES-8, No. 5, 1972, pages 685-687; and Blanchard, R. L., "*A new Algorithm for Computing Inertial Altitude and Vertical Velocity*", IEEE Transactions on Aerospace and Electronic Systems, Vol. AES-7, November 1971, pages 1143-1146.)

Aviation authorities or service providers (approved air navigation service providers, ANSP) also provide so-called "height-monitoring units" (HMUs) for performing the so-called HMU method or so-called "GPS-based monitoring units" (GMUs) for performing the GMU method for checking the accuracy of barometrically determined altitudes $z_{AC}(t)$ in flight operations.

In the so-called "HMU method", the barometric altitude $z_{AC}(t)$ determined by the barometric pressure measuring system of the flying device to be tested is compared to an altitude obtained from comparative measurements. The Blanchard method can be used here as well. The geometrical comparative altitude of the flying device is typically determined within the observation area of an associated ground station (approximately 40 nautical miles around the ground station) by a long-term measurement of a transponder signal of the flying device and/or by radar. Such comparative measurements are currently limited to a flight level range from FL 290 to FL 410 (FL=flight level). During the comparative measurement, the flying device must fly at a constant altitude for at least 5 minutes. This means that the HMU method requires the use of at least one HMU ground unit, special calibrating flights, partially with additional equipment, and incurs respective additional costs. The services of an approved air navigation service provider are typically needed for this purpose.

The GMU method typically uses a portable GMU (GPS-based monitoring unit) for altitude measurement by a Global Navigation Satellite System (GNSS) on board (aboard) of the flying device for comparative measurements. The comparative altitude is for example determined based on balloon measurements and, optionally, other meteorological measurements (temperature profiler), supported by weather data from numerical models, and adjusted with pressure level measurements of other flying devices in the same air space.

In addition to determining the barometric altitude $z_{AC}(t)$ which is essential for flight control, it is still important to determine the static pressure $p_{AC}(t)$ as accurately as possible to infer the dynamic pressure and thus the air speed (e.g. Mach number) from the measurements of the total air pressure. Faults of static pressure measurement thus immediately affect faults when determining the dynamic pressure. Exact knowledge of the static and dynamic pressure is also required for determining the static temperature from measuring the temperature $T_{acc}$ in the air accumulated in the flying device.

The methods for fault detection in barometric pressure measuring systems known in prior art have the disadvantage that they typically require flight tests and are costly and time consuming They particularly make minor changes on the flying device, such as temporary add-ons to/removals from the flying device expensive, time consuming and difficult, because these change the aerodynamics of the flying device and therefore require recalibration of the barometric pressure measuring system. It is another disadvantage of prior art that neither the pilots nor air traffic controllers have a simple way of monitoring the functioning and precision of the static pressure $p_{AC}(t)$ and the barometric altitude $z_{AC}(t)$ determined by the barometric pressure measuring system, and to determine respective accuracy trends. Therefore, the functioning and precision of the barometric pressure measuring system has to be checked regularly in a major effort in prior art. Testing the components of the barometric pressure measuring system on the ground cannot sufficiently ensure the precision of the pressure measuring system in flight.

SUMMARY

It is therefore an object of the invention to provide a method and a fault determination device with which a fault of a barometric pressure measuring system arranged aboard a flying device can be easily determined, including during a flight. The invention is to avoid the disadvantages as mentioned herein.

The invention is derived from the features of the independent claims Advantageous further developments and embodiments are the subject matter of the dependent claims. Other features, applications, and advantages of the invention can be derived from the description below and the explanation of example embodiments of the invention shown in the figures.

A first aspect of the invention relates to a method of determining a fault of a barometric pressure measuring system arranged aboard a flying device, wherein the barometric pressure measuring system is configured to determine a static pressure $p_{AC}(t)$ and/or a barometric altitude $z_{AC}(t)$. The method thus includes the following steps: In a first step, determining a current position $POS_{GNSS}(t)$ and altitude $z_{GNSS}(t)$ of the flying device in a geodetic reference system at a point in time t using a satellite navigation system GNSS arranged aboard a flying device. In a second step, determining a geopotential altitude $z_{AN/PROG}(t)$ related to the static pressure $p_{AC}(t)$ for the position $POS_{GNSS}(t)$ in provided weather analysis data $AN_{DAT}$ or in provided weather prognosis data $PROG_{DAT}$ of a numerical weather prediction model (NWP). Additionally, or alternatively, in a third step, determining a static pressure $p_{AN/PROG}(t)$ related to the altitude $z_{GNSS}(t)$ for the position $POS_{GNSS}(t)$ in provided weather analysis data $AN_{DAT}$ or in provided weather prognosis data $PROG_{DAT}$ of a numerical weather prediction model (NWP). In a fourth step, determining the altitude deviation $\Delta z(t)=z_{GNSS}(t)-z_{AN/PROG}(t)$ and/or determining the pressure deviation $\Delta p(t)=p_{AC}(t)-p_{AN/PROG}(t)$. In a fifth step, determining an altitude deviation $\Delta z^*$ averaged over a period of time $\Delta t$ from $\Delta z(t)=z_{GNSS}(t)-z_{AN/PROG}(t)$ and/or determining a pressure deviation $\Delta p^*$ averaged over a period of time $\Delta t$ from $\Delta p(t)=p_{AC}(t)-p_{AN/PROG}(t)$. In a sixth step, generating a warning signal if a fault of the barometric pressure measuring system is detected, wherein the fault is deemed detected if an absolute value of the determined averaged altitude deviation $|\Delta z^*|$ is greater than or equal to a specified threshold G1, or if an absolute value of the averaged pressure deviation $|\Delta p^*|$ is greater than or equal to a specified threshold G2.

As used herein, the term "flying device" has a wider meaning. It includes all apparatuses which fly or travel in a planet's atmosphere (particularly in the Earth's atmosphere), particularly flying devices which are lighter than the medium of the atmosphere (e.g., air): free balloons, tethered balloons, hot-air balloons, airships, etcetera, as well as flying devices which are heavier than the medium of the atmosphere: gliders, hang-gliders, paragliders, rotorcraft, drones, military airplanes, cargo airplanes, passenger airplanes, sports airplanes, ultralight airplanes, etcetera.

The "barometric pressure measuring system" advantageously includes lines to measuring points for tapping the static pressure, for tapping the total pressure, for tapping the differential pressure, furthermore advantageous electric lines to measuring sensors, e.g., for pressures, air temperature and/or humidity, an evaluation device (e.g., an air data computer, ADC) and an electric interface for providing the measured data obtained, particularly the static pressure $p_{AC}(t)$ and barometric altitude $z_{AC}(t)$. Calibration curves or calibration parameters for determining the static pressure $p_{AC}(t)$ and barometric altitude $z_{AC}(t)$ or other measured data are taken into account by the evaluation device. The pressure lines must be leak proof. Leakages of the pressure line system will generate measuring errors.

As used herein, the term "fault" has a wider meaning. It generally includes every fault of the barometric pressure measuring system that has an effect on the following measured variables: static air pressure $p_{AC}(t)$ and/or barometric altitude $z_{AC}(t)$ of the barometric pressure measuring system. Such faults can be caused, for example, by incorrect calibration of the barometric pressure measuring system, a defective sensor within the barometric pressure measuring system, leakages/leaks of the barometric pressure measuring system, or faulty electronics of the barometric pressure measuring system.

The "satellite navigation system GNSS" advantageously is a GPS, Galileo, or GLONASS-based navigation system with which the current position $POS_{GNSS}(t)$ (position on the surface of the Earth, e.g., as x,y-coordinates) and altitude $z_{GNSS}(t)$ of the flying device can be determined depending on time in a geodetic reference system. Other satellite navigation systems GNSS are included in the inventive idea.

A differential satellite navigation system (such as a DGPS) is advantageously used as satellite navigation system GNSS aboard the flying device. Such a differential satellite navigation system currently allows altitude measurements for $z_{GNSS}(t)$ at an accuracy of approximately 0.2 m and position measurements for $POS_{GNSS}(t)$ at a resolution of approximately 0.3 m.

As used herein, the term "geodetic reference system" denotes an earth model that advantageously takes into account the most important parameters of the figure of the Earth, the rotation of the Earth, and its gravitational field. Advantageous are the WGS84 geodetic reference system (with the EGM96 or EGM2008 gravitation model) or the ETRS89 reference system. Other geodetic reference systems are included in the inventive idea.

The determination of the static pressure $p_{AC}(t)$ and/or the barometric altitude $z_{AC}(t)$ is performed using the barometric pressure measuring system in a time-dependent manner Current calibration parameters or calibration curves specified for the barometric pressure measuring system are included in the determination of the static pressure $p_{AC}(t)$ and the barometric altitude $z_{AC}(t)$.

In the second step, weather analysis data $AN_{DAT}$ or weather prognosis data $PROG_{DAT}$ of a numerical weather prediction model (NWP) are provided to determine geopotential altitudes $z_{AN/PROG}(t)$ related to the measured static pressures $p_{AC}(t)$ for the positions $POS_{GNSS}(t)$, and/or in the third step, to determine static pressures $p_{AN/PROG}(t)$ related to the determined altitudes $z_{GNSS}(t)$ for the positions $POS_{GNSS}(t)$.

A connection between geopotential altitudes $z_{AN/PROG}(t)$ and related barometric pressure levels $p_{AN/PROG}(t)$ are taken from the weather analysis data $AN_{DAT}$ and weather prognosis data $PROG_{DAT}$ of a numerical weather prediction model (NWP). The analysis data $AN_{DAT}$ for weather conditions prevailing at point in time $t_1$ and a position $POS_{GNSS}(t_1)$ are only available at a time $t_1+\Delta t_{analysis}$, wherein $\Delta t_{analysis}$ indicates a period of time required for analyzing the weather data detected at time $t_1$ and for providing the respective analysis data $AN_{DAT}$. Analysis data $AN_{DAT}$ are therefore particularly suitable for later evaluation of measured data which were determined by the barometric pressure measuring system during a flight. Geopotential altitudes $z_{AN/PROG}(t)$ and static pressures $p_{AN/PROG}(t)$ determined from analysis data $AN_{DAT}$ are typically more accurate than the geopotential altitudes $z_{PROG}(t)$ and static pressures $p_{PROG}(t)$ determined from weather prognosis data $PROG_{DAT}$.

Advantageously, the weather prediction model (NWP) considers an acceleration due to gravity $g=g(POS, h)$ depending on the position POS (on the surface of the Earth) and altitude h, as well as a geoid undulation for generating the weather prognosis data $PROG_{DAT}$. "Geoid undulation" denotes a distance of the geoid from a reference ellipsoid in the ellipsoid point reviewed, measured along the ellipsoid normal. Geoid undulations can be up to 100 m with respect to a medium reference ellipsoid for the Earth.

Furthermore, advantageously, the numerical weather prognosis system NWP includes model pressure surfaces $p_k$, for which prognostic equations for temperature, humidity, etc. are solved, such that prognosis data $PROG_{RAWDAT}(t)$ are initially available for the model pressure surfaces $p_k$. For determining the weather prognosis data $PROG_{DAT}(t)$, the prognosis data $PROG_{RAWDAT}(t)$ are advantageously linearly interpolated over time t and linearly interpolated over geographic coordinates and logarithmically interpolated over the pressure field with respect to the position $POS_{GNSS}(t)$ of the flying device between model half-level pressure surfaces $p_{k+1/2}=a_{k+1/2}+b_{k+1/2}*p_{sfc}$, wherein:

$k=0, \ldots, K$;

$p_{k+1/2}=0$ for $k=0$;

$p_{sfc}$: static pressure on the ground for $k=K$; and $a_{k+1/2}$, $b_{k+1/2}$ are constant coefficients.

For more information about model pressure surfaces in a numerical weather prediction model (NWP), see the article by Simmons, A. and Burridge, D. M., "*An Energy and Angular-Momentum Conserving Vertical Finite-Difference Scheme and Hybrid Vertical Coordinate*" Mon. Wea. Rev., Vol. 109, No. April 1981, pages: 758 to 766. Other numerical methods use unstructured networks, finite elements, or other discrete approximations of the calculated field variables. These require adjusted optimized interpolation methods.

The above-mentioned advantageous features of the weather prediction model (NWP) result in an increase in the level of accuracy with which the variables $z_{AN/PROG}(t)$ and $p_{AN/PROG}(t)$ can be determined. Because short-term prognoses are more accurate, it is advantageous to use weather prognosis data $PROG_{DAT}(t)$ for a forecast period of less than two days.

Advantageously, the "Integrated Forecast System" (IFS) of ECMWF ("European Centre for Medium-Range Weather Forecasts") is used as NWP weather prediction model. Other weather prediction models are of course covered by the inventive idea.

The fourth step includes determining the altitude deviation $\Delta z(t)=z_{GNSS}(t)-z_{AN/PROG}(t)$ and/or determining the pressure deviation $\Delta p(t)=p_{AC}(t)-p_{AN/PROG}(t)$.

The fifth step includes determining an altitude deviation $\Delta z^*$ averaged over a period of time $\Delta t$ from $\Delta z(t)=z_{GNSS}(t)-z_{AN/PROG}(t)$ and/or determining a pressure deviation $\Delta p^*$ averaged over a period of time $\Delta t$ from $\Delta p(t)=p_{AC}(t)-p_{AN/PROG}(t)$, wherein a fault of the barometric pressure measuring system is deemed detected if an absolute value of the averaged altitude deviation $|\Delta z^*|$ is greater than or equal to a specified threshold G1, or if an absolute value of the averaged pressure deviation $|\Delta p^*|$ is greater than or equal to a specified threshold G2.

The altitude deviation $\Delta z^*$ advantageously results, for example, in an average value $<\Delta z(t)>$ or in a difference of mean values $<z_{GNSS}(t)>-<z_{AN/PROG}(t)>$ for the period $\Delta t$. Likewise, the pressure deviation $\Delta p^*$ results, for example, in an average value $<\Delta p(t)>$ or in a difference of mean values $<p_{AC}(t)>-<p_{AN/PROG}(t)>$. Advantageously, average values are only generated for flight stages with a constant altitude and air speed. Furthermore, advantageously, no flight maneuvers such as turns are performed in these flight stages. The period $\Delta t$ is advantageously selected from the range [1 min, 10 h], it advantageously is 10 min, 20 min, 30 min, 1 h, 2 h, 3 h, 4 h, or 5 h. Advantageously, sliding average values are determined for the period $\Delta t$. The average value can be determined in the most varied ways. For example, an average value can be a median, an arithmetic mean, a geometric mean, a harmonic mean, a quadratic mean, or a cubic mean, etcetera. Furthermore, the average value can be weighted.

It is already possible today, when using the proposed method, to verify the pressure and altitude measurements on a flying device in the range of globally available weather data with an accuracy of better than +/−10 m or +/−30 feet at a 95% confidence interval based on weather analysis data $AN_{DAT}$ or weather prognosis data $PROG_{DAT}$ of a numerical weather prediction model (NWP).

The proposed method allows monitoring the functioning and accuracy of the barometric pressure measuring system in flight. The results of this monitoring can be output in the flying device and/or transmitted to a ground station and output there.

An advantageous further development of the proposed method is characterized in that a warning signal is generated if the absolute value of the altitude deviation $|\Delta z(t)|$ or averaged altitude deviation $|\Delta z^*|$ is greater than or equal to a specified threshold G1, or that a warning signal is generated if the absolute value of the pressure deviation $|\Delta p(t)|$ or averaged pressure deviation $|\Delta p^*|$ is greater than or equal to a specified threshold G2. This warning signal is advantageously an electric warning signal, which particularly can trigger the output of an optically, haptically, and/or acoustically perceivable warning.

In an advantageous further development of the method, the warning signal is output aboard the flying device as an optical, haptic, and/or acoustic warning signal, and/or it is transmitted to a ground station to be further processed there and/or to be output there as an optical, haptic, and/or acoustic warning signal.

An advantageous further development of the method is characterized in that a calibration of the barometric pressure measuring system, advantageously an automatic self-calibration of the barometric pressure measuring system is performed based on the altitude deviation $\Delta z(t)$ or averaged altitude deviation $\Delta z^*$ and/or the pressure deviation $\Delta p(t)$ or averaged pressure deviation $\Delta p^*$. Calibration of the barometric pressure measuring system is, for example, performed after a flight for which the respective data was determined. It is advantageous to perform automatic self-calibration of the barometric pressure measuring system in flight. Automatic self-calibration is advantageously triggered if the absolute value of the averaged altitude deviation $|\Delta z^*|$ is greater than or equal to a specified threshold G3, or if the absolute value of the averaged pressure deviation $|\Delta p^*|$ is greater than or equal to a specified threshold G4. Self-calibration ensures more robust accuracy of the variables determined by the barometric pressure measuring system in flight.

An advantageous further development of the method is characterized in that, based on an electric status $STAT_{elec}(t)$ of the barometric pressure measuring system and based on one or several of the variables: $\Delta z(t)$, $z_{AC}(t)$, $z_{GNSS}(t)$, $z_{AN/PROG}(t)$, $\Delta p(t)$, $p_{AC}(t)$, $p_{AN/PROG}(t)$, total pressure $p_{stau}(t)$, stagnation temperature $T_{stag}(t)$, and optionally other variables, an automatic evaluation is performed with respect to a sensor fault, an electrical fault, or a line breakage/leakage of a pressure line of the barometric pressure measuring system. If the evaluation results in detection of one of the faults described above, such fault will advantageously be specified in an optical and/or acoustic output, i.e., a sensor fault or electrical fault or line breakage/leakage in the barometric pressure measuring system is advantageously displayed in the flying device and/or a ground unit in communication with the flying device, depending on the type of fault.

Advantageously, when calibrating the barometric pressure measuring system, particularly during automatic self-calibration of the barometric pressure measuring system, a status STAT(t) of the flying device is taken into account. The status STAT(t) of the flying device is for this purpose detected and provided by respective sensors. As used herein, the term "status of the flying device" has a wider meaning. It particularly includes the aerodynamic status and the mechanical configuration status of the flying device.

Advantageously, the status STAT(t) of the flying device is determined by one or several of the following variables: Mach number, angle of attack, yaw angle, roll angle, weight of the flying device, configuration of the flying device with respect to its outer shape (such as temporary external add-ons to the flying device, such as antennas, aerodynamic covers for measuring systems (radar, LIDAR, etc.)), flap position, and/or landing gear position. The configuration of the flying device with respect to its outer shape can for example be taken into account in the form of specified or stored key figures.

The proposed method has the following advantages. The proposed method allows making a statement whether the calibration of the barometric pressure measuring system is within specified thresholds or whether it must be corrected. The proposed method further allows calibration of the barometric pressure measuring system as a function of the parameters specified above both in flight and after or before other flight operations. The method makes it particularly possible to permanently monitor quality of the pressure measuring system in flight operations. For example, the method can be used to check the function of the barometric altimeter across all altitude levels during the entire flight. The check can simultaneously be performed on the ground, or the monitoring result can be transmitted to a respective ground facility. For example, air traffic control can be informed that the altitude readings of the flying device are unreliable, such that respective action can be taken. The numerical data needed for the method (analysis data $AN_{DAT}$/weather prognosis data $PROG_{DAT}(t)$) are currently available every 12 hours, due to weather forecasts even for days ahead, including the period of time of a pending flight and in time before takeoff.

These weather prognosis data $PROG_{DAT}(t)$ can be loaded before takeoff from the ground from a data network onto a computer aboard the flying device and/or onto a computer of an air traffic controller on the ground. Advantageously, the measured data of the pressure measuring system, $z_{AC}(t)$ and/or $p_{AC}(t)$, and the satellite navigation system, $POS_{GNSS}(t)$, $z_{GNSS}(t)$, are communicated online to a ground facility and are available there for a respective evaluation, as described above. In this way, the altitude deviation $\Delta z(t)$ between the altitude measured by the satellite navigation system $z_{GNSS}(t)$ and the geopotential altitude $z_{AN/PROG}(t)$ predicted based on weather prognosis data $PROG_{DAT}(t)$ and/or determined based on weather analysis data $AN_{DAT}$ can be determined both in the flying device and at a suitable ground facility, such that respective conclusions can be drawn, and action be taken where required.

The method described avoids the disadvantages mentioned in the introduction to this description of prior art methods for fault detection in a barometric pressure measuring system of a flying device. Particularly, no additional flights, no special installations of measuring equipment, and no services by a navigation service provider are required.

There is a demand for the proposed method for calibrations of pressure measuring systems among manufacturers of flying devices of all kinds. When developing new flying device types, numerous test flights are performed for manifold purposes as part of flight testing. The presented method can be used here for quality monitoring and independent testing of the pressure measuring system of the flying device. The method described herein can be applied particularly cost-effectively, easily, and operationally when modifying flying devices, repairing damaged flying devices, for first licensing a flying device with add-ons, or for any other changes of the aerodynamic properties of a flying device. This is particularly true of flying devices having extreme fields of application (altitudes and speeds), in which respective test flights are difficult due to lack of an observer on board or other ways of comparison.

Another aspect of the present invention relates to a device for determining a fault of a barometric pressure measuring system arranged aboard a flying device, which is configured and designed for determining a static pressure $p_{AC}(t)$ and/or a barometric altitude $z_{AC}(t)$.

The device includes a satellite navigation system GNSS arranged aboard the flying device to determine an actual position $POS_{GNSS}(t)$ and an altitude $z_{GNSS}(t)$ of the flying device in a geodetic reference system at the time t; an interface for providing weather analysis data $AN_{DAT}$ or weather prognosis data $PROG_{DAT}$ of a numerical weather prediction model (NWP) for the position $POS_{GNSS}(t)$ and altitude $z_{GNSS}(t)$; and an evaluation unit configured to determine a geopotential altitude $z_{AN/PROG}(t)$ related to the static pressure $p_{AC}(t)$ in the weather analysis data $AN_{DAT}$ or weather prognosis data $PROG_{DAT}$, and/or to determine a static pressure $p_{AN/PROG}(t)$ related to the altitude $z_{GNSS}(t)$ in the weather analysis data $AN_{DAT}$ or weather prognosis data $PROG_{DAT}$; wherein the evaluation unit is furthermore configured to determine the altitude deviation $\Delta z(t)=z_{GNSS}(t)-z_{AN/PROG}(t)$ and/or the pressure deviation $\Delta p(t)=p_{AC}(t)-p_{AN/PROG}(t)$ as well as determine an altitude deviation $\Delta z^*$ averaged over a period $\Delta t$ from $\Delta z(t)=z_{GNSS}(t)-z_{AN/PROG}(t)$ and/or determine a pressure deviation $\Delta p^*$ averaged over the period $\Delta t$ from $\Delta p(t)=p_{AC}(t)-p_{AN/PROG}(t)$ Finally, the device includes a comparator unit which is configured to generate a warning signal if a fault of the pressure measuring system is detected, wherein the fault is deemed detected if an absolute value of the averaged altitude deviation $|\Delta z^*|$ is greater than or equal to a specified threshold G1, or if an absolute value of the averaged pressure deviation $|\Delta p^*|$ is greater than or equal to a specified threshold G2.

The device is particularly designed and configured for performing a method as described above.

An advantageous further development of the device is characterized in that the pressure measuring system is designed and configured for automatic self-calibration of the pressure measuring system based on the determined altitude deviations $\Delta z(t)$ or averaged altitude deviations $\Delta z^*$ and/or the determined pressure deviations $\Delta p(t)$ or averaged pressure deviations $\Delta p^*$, wherein this self-calibration is performed if the comparator unit has detected a fault and/or the warning signal was received.

In one embodiment of the proposed device, the interface, the evaluation unit and the comparator unit are arranged aboard the flying device. The interface is advantageously connected to a receiver, which is designed and configured for wireless receipt of the weather analysis data $AN_{DAT}$ or weather prognosis data $PROG_{DAT}$. The interface is advantageously connected to a storage unit, on which the weather analysis data $AN_{DAT}$ or weather prognosis data $PROG_{DAT}$ can be stored. Furthermore, advantageously, a communication unit is provided, which communicates the warning signal generated and/or the variables: $z_{GNSS}(t)$ and/or $p_{AC}(t)$ and/or $\Delta z(t)$ and/or $\Delta p(t)$ to a ground facility. Advantageously, the ground facility outputs an optically, acoustically, and/or haptically perceivable warning after receiving the warning signal.

Advantageously, the device further includes a status detection unit, which determines a status STAT(t) of the flying device, wherein the pressure measuring system performs the automatic self-calibration depending on the status STAT(t) of the flying device. The status detection unit has respective sensors for this purpose. These sensors are designed such that one or several of the following variables can be determined: Mach number, angle of attack, yaw angle, roll angle, weight of the flying device, center of gravity, flap position, and/or landing gear position. Furthermore, the status detection unit is connected to a storage unit on which the outer aerodynamically effective (outer) shape of the flying object can optionally be stored in the form of features or a respective coding. The outer shape covers, for example, aerodynamically effective add-ons, tank vessels, radomes, antenna assemblies, etc. and thus taken into account during the calibration of the pressure measuring system.

Advantages and advantageous further developments of the proposed device can be derived by applying the explanations made in conjunction with the method described analogously and accordingly. Reference is made for this purpose to the preceding parts of this description.

The invention further relates to a flying device having a proposed device.

The object of the invention is further achieved by a computer system with a data processing device, wherein the data processing device is designed such that a method as described above is executed by the data processing device.

The object of the invention is further achieved by a digital storage medium with electronically readable control signals, wherein the control signals can interact with a programmable computer system, such that a method as described above is executed.

Furthermore, the object of the invention is achieved by a computer program product with a program code stored on a machine readable carrier and intended for executing the method as described above when the program code is executed on a data processing device.

Finally, the invention relates to a computer program with program codes for executing the method as described above, if the program runs on a data processing device. The data processing device can be designed for this purpose as any computer system known from prior art.

Other advantages, features and details can be derived from the description below, in which at least one example embodiment is described in detail and with reference to the drawing, where appropriate. Identical, similar, and/or functionally identical parts were assigned the same reference symbols.

DETAILED DESCRIPTION

Figure 1:
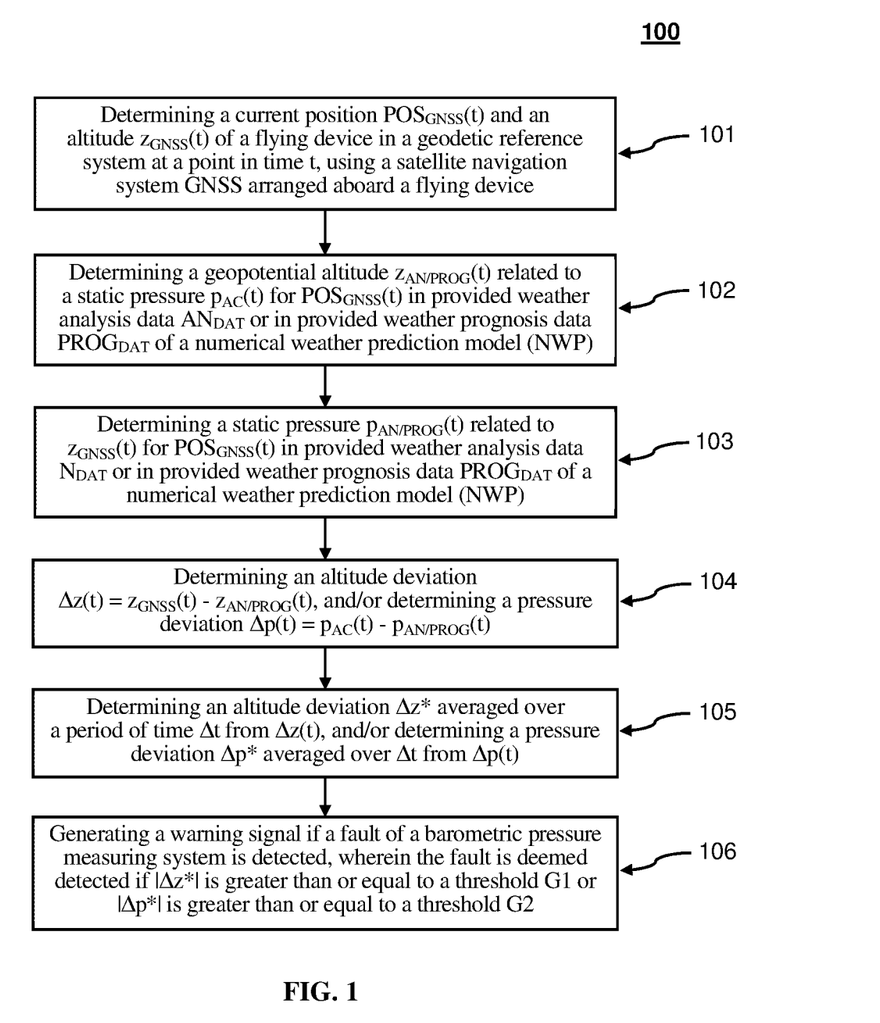
FIG. 1 shows a schematic flowchart of a variant of the proposed method of determining a fault of a barometric pressure measuring system.

FIG. 1 shows a schematic flowchart of a variant of the proposed method 100 of determining a fault of a barometric pressure measuring system arranged aboard a flying device, wherein the barometric pressure measuring system is configured to determine a static pressure $p_{AC}(t)$ and/or a barometric altitude $z_{AC}(t)$. The method 100 includes the following steps.

In a first step 101, a current position $POS_{GNSS}(t)$ and altitude $z_{GNSS}(t)$ of the flying device in a geodetic reference system at a point in time t is determined using a satellite navigation system GNSS arranged aboard a flying device.

In a second step 102, a geopotential altitude $z_{AN/PROG}(t)$ related to the static pressure $p_{AC}(t)$ is determined for the position $POS_{GNSS}(t)$ in provided weather analysis data $AN_{DAT}$ or in provided weather prognosis data $PROG_{DAT}$ of a numerical weather prediction model (NWP). Additionally or alternatively, in a third step 103, a static pressure $p_{AN/PROG}(t)$ related to the altitude $z_{GNSS}(t)$ is determined for the position $POS_{GNSS}(t)$ in provided weather analysis data $AN_{DAT}$ or in provided weather prognosis data $PROG_{DAT}$ of a numerical weather prediction model (NWP).

In a fourth step 104, the altitude deviation $\Delta z(t) = z_{GNSS}(t) - z_{AN/PROG}(t)$ and/or the pressure deviation $\Delta p(t) = p_{AC}(t) - p_{AN/PROG}(t)$ are determined.

In a fifth step 105, an altitude deviation $\Delta z^*$ averaged over a period of time $\Delta t$ from $\Delta z(t) = z_{GNSS}(t) - z_{AN/PROG}(t)$ and/or a pressure deviation $\Delta p^*$ averaged over a period of time $\Delta t$ from $\Delta p(t) = p_{AC}(t) - p_{AN/PROG}(t)$ are determined.

In a sixth step 106, a warning signal is generated if a fault of the barometric pressure measuring system is detected, wherein the fault is deemed detected if an absolute value of the averaged altitude deviation $|\Delta z^*|$ is greater than or equal to a specified threshold G1, or if an absolute value of the averaged pressure deviation $|\Delta p^*|$ is greater than or equal to a specified threshold G2.

Figure 2:
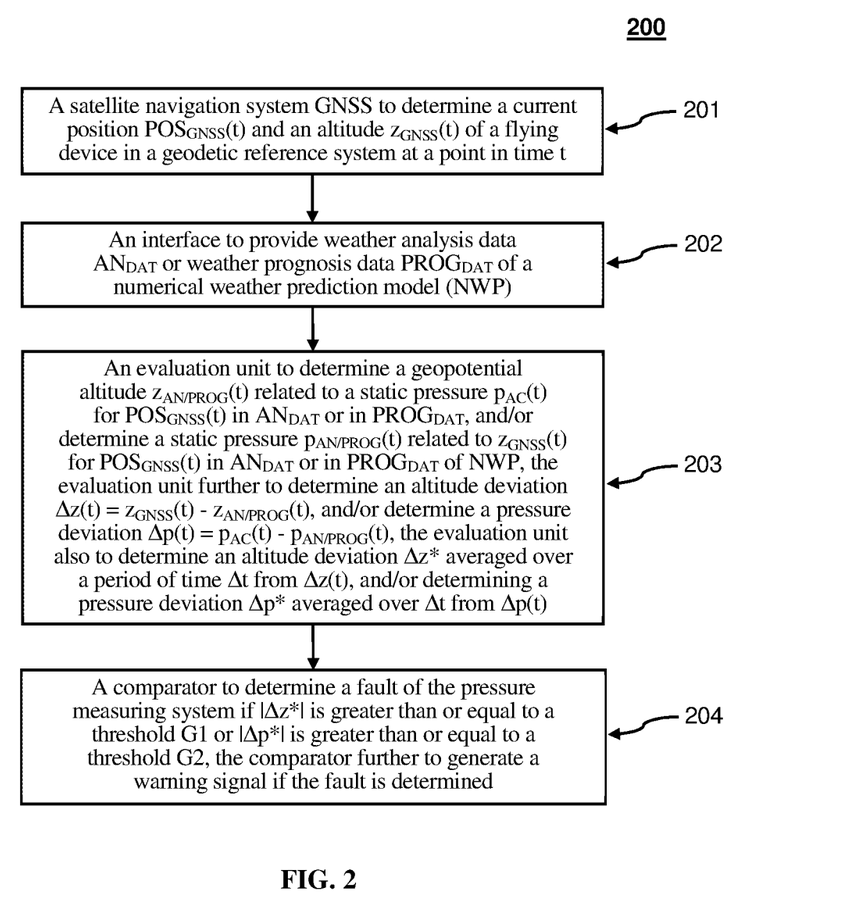
FIG. 2 shows a schematic structure of a variant of the proposed fault determination device to determine a fault of a barometric pressure measuring system.

FIG. 2 shows a schematic structure of a variant of the proposed fault determination device 200 to determine a fault of a barometric pressure measuring system arranged aboard a flying device, wherein the barometric pressure measuring system determines a static pressure $p_{AC}(t)$ and/or a barometric altitude $z_{AC}(t)$. The device includes a satellite navigation system 201 GNSS, an interface 202, an evaluation unit 203, and a comparator unit 204. The satellite navigation system 201 GNSS is configured to determine an actual position $POS_{GNSS}(t)$ and an altitude $z_{GNSS}(t)$ of the flying device in a geodetic reference system at the time t. The interface 202 is configured to provide weather analysis data $AN_{DAT}$ or weather prognosis data $PROG_{DAT}$ of a numerical weather prediction model (NWP) for the position $POS_{GNSS}(t)$ and altitude $z_{GNSS}(t)$. The evaluation unit 203 is configured to determine a geopotential altitude $z_{AN/PROG}(t)$ related to the static pressure $p_{AC}(t)$ in the weather analysis data $AN_{DAT}$ or weather prognosis data $PROG_{DAT}$, and/or to determine a static pressure $p_{AN/PROG}(t)$ related to the altitude $z_{GNSS}(t)$ in the weather analysis data $AN_{DAT}$ or weather prognosis data $PROG_{DAT}$; wherein the evaluation unit is further configured to determine the altitude deviation $\Delta z(t) = z_{GNSS}(t) - z_{AN/PROG}(t)$ and/or the pressure deviation $\Delta p(t) = p_{AC}(t) - p_{AN/PROG}(t)$ as well as to determine an altitude deviation $\Delta z^*$ averaged over a period $\Delta t$ from $\Delta z(t) = z_{GNSS}(t) - z_{AN/PROG}(t)$ and/or to determine a pressure deviation $\Delta p^*$ averaged over the period $\Delta t$ from $\Delta p(t) = p_{AC}(t) - p_{AN/PROG}(t)$. The comparator unit 204 is configured to generate a warning signal if a fault of the barometric pressure measuring system is detected, wherein the fault is deemed detected if the comparator determines that an absolute value of the averaged altitude deviation $|\Delta z^*|$ is greater than or equal to a specified threshold G1, or if an absolute value of the averaged pressure deviation $|\Delta p^*|$ is greater than or equal to a specified threshold G2.

Figure 3:
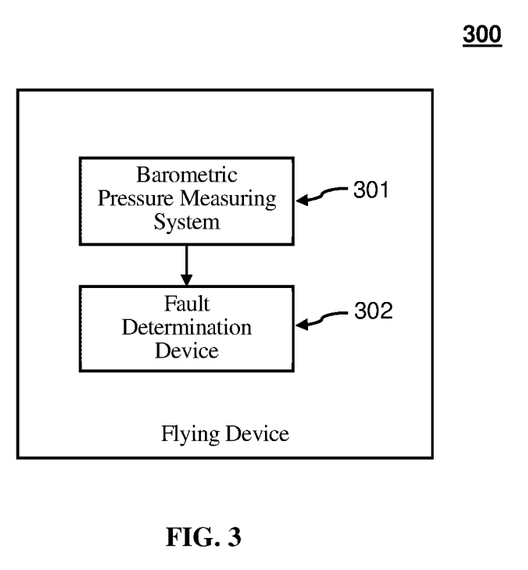
FIG. 3 shows a schematic structure of a flying device that includes a barometric pressure measuring system and fault determination device in accordance with FIGS. 1 and 2.

FIG. 3 shows a schematic structure of a flying device 300 that includes a barometric pressure measuring system 301 and fault determination device 302 in accordance with FIGS. 1 and 2. The barometric pressure measuring system 301 and the fault determination device 302 are arranged aboard the flying device 300 so that the fault determination device 302 can be used to easily determine a fault of the barometric pressure measuring system 301, including during a flight of the flying device 300. In particular, the fault determination device 302 can incorporate the operations of the variant of the fault determination method 100 and/or the functionality of the variant of the fault determination device 200, as shown respectively in FIGS. 1 and 2, and/or any other variations described hereinabove with respect to the fault determination method and the fault determination device, for determining a fault of a barometric pressure measuring system 301.

Although the invention was described in detail by preferred example embodiments, the invention is not limited by the disclosed examples, and a person skilled in the art can derive other variations without leaving the scope of protection of the invention. It will therefore be appreciated that a plurality of variation options exists. It will also be appreciated that embodiments mentioned as examples are indeed just examples, which should not be interpreted as limiting, for example, the scope of protection, potential applications, or the configuration of the invention. Instead, the above description and description of figures enable a person skilled in the art to implement the example embodiments in detail, wherein the person skilled in the art, knowing the disclosed rationale of the invention, can make multiple changes, for example with respect to the function or arrangement of individual elements mentioned in an example embodiment, without leaving the scope of protection which is defined by the claims and their legal equivalents, such as the further explanation in the description.

LIST OF REFERENCE SYMBOLS

100 Fault determination method
101-106 Method steps of the fault determination method
200 Fault determination device
201 Satellite navigation system GNSS
202 Interface
203 Evaluation unit
204 Comparator unit
300 Flying device
301 Barometric pressure measuring system
302 Fault determination device

The invention claimed is:

1. A method of determining a fault of a barometric pressure measuring system arranged aboard a flying device, the barometric pressure measuring system configured to determine a static pressure $p_{AC}(t)$ and/or a barometric altitude $z_{AC}(t)$, the method comprising:
   determining a position $POS_{GNSS}(t)$ and an altitude $z_{GNSS}(t)$ of the flying device in a geodetic reference system at a point in time t using a satellite navigation system GNSS arranged aboard a flying device;
   determining a geopotential altitude $z_{AN/PROG}(t)$ related to the static pressure $p_{AC}(t)$ for the position $POS_{GNSS}(t)$ in provided weather analysis data $AN_{DAT}$ or in provided weather prognosis data $PROG_{DAT}$ of a numerical weather prediction model (NWP); and/or
   determining a static pressure $p_{AN/PROG}(t)$ related to the altitude $z_{GNSS}(t)$ for the position $POS_{GNSS}(t)$ in provided weather analysis data $AN_{DAT}$ or in provided weather prognosis data $PROG_{DAT}$ of a numerical weather prediction model (NWP);

determining an altitude deviation $\Delta z(t)=z_{GNSS}(t)-z_{AN/PROG}(t)$ and/or determining a pressure deviation $\Delta p(t)=p_{AC}(t)-p_{AN/PROG}(t)$;

determining an altitude deviation $\Delta z^*$ averaged over a period of time $\Delta t$ from $\Delta z(t)=z_{GNSS}(t)-z_{AN/PROG}(t)$ and/or determining a pressure deviation $\Delta p^*$ averaged over a period of time $\Delta t$ from $\Delta p(t)=p_{AC}(t)-p_{AN/PROG}(t)$; and generating a warning signal if a fault of the barometric pressure measuring system is detected, wherein the fault is deemed detected if an absolute value of the averaged altitude deviation $|\Delta z^*|$ is greater than or equal to a specified threshold G1, or if an absolute value of the averaged pressure deviation $|\Delta p^*|$ is greater than or equal to a specified threshold G2.

2. The method according to claim 1, wherein the method comprises:

triggering based on the warning signal generated aboard the flying device, an optically, acoustically, and/or haptically perceivable output of the warning signal, and/or transmitting the warning signal to a ground facility to be processed further, and/or triggering an optically, acoustically, and/or haptically perceivable output of the warning signal at the ground facility.

3. The method according to claim 1, wherein the geodetic reference system is a WGS84 geodetic reference system with a WGS84 or EGM2008 gravitation model, or the ETRS89 reference system.

4. The method according to claim 1, wherein the satellite navigation system GNSS is a differential satellite navigation system.

5. The method according to claim 1, wherein the method comprises performing an automatic self-calibration of the pressure measuring system when the fault is detected.

6. The method according to claim 5, wherein the method comprises taking into account a determined status STAT(t) of the flying device during the automatic self-calibration of the pressure measuring system, wherein the status STAT(t) of the flying device is determined by one or several of following variables: Mach number; angle of attack; yaw angle; roll angle; weight of the flying device; center of gravitation; configuration of the flying device; flap position; and landing gear position.

7. The method according to claim 1, wherein the numerical weather prediction model (NWP):

comprises model pressure surfaces $p_k$, for which initially there are prognosis data $PROG_{RAWDAT}(t)$, and wherein for determining the weather prognosis data $PROG_{DAT}(t)$, the prognosis data $PROG_{RAWDAT}(t)$ are linearly interpolated over time t and linearly interpolated over geographic coordinates and logarithmically interpolated over the pressure field with respect to the position $POS_{GNSS}(t)$ of the flying device between model half-level pressure surfaces $p_{k+1/2}=a_{k+1/2}+b_{k+1/2}*p_{sfc}$, wherein $k=0, \ldots, K$; $p_{k+1/2}=0$ for $k=0$; $p_{sfc}$: static pressure on the ground for $k=K$; and $a_{k+1/2}$, $b_{k+1/2}$ are constant coefficients;

takes into account an acceleration due to gravity g depending on the position POS and altitude h; and takes into account a geoid undulation.

8. A fault determination device to determine a fault of a barometric pressure measuring system arranged aboard a flying device, the barometric pressure measuring system configured to determine a static pressure $p_{AC}(t)$ and/or a barometric altitude $z_{AC}(t)$, the fault determination device comprising:

a satellite navigation system GNSS to determine a position $POS_{GNSS}(t)$ and an altitude $z_{GNSS}(t)$ of the flying device in a geodetic reference system at the time t;

an interface to provide weather analysis data $AN_{DAT}$ or weather prognosis data $PROG_{DAT}$ of a numerical weather prediction model (NWP) for the position $POS_{GNSS}(t)$ and altitude $z_{GNSS}(t)$;

an evaluation unit configured to determine a geopotential altitude $z_{AN/PROG}(t)$ related to the static pressure $p_{AC}(t)$ for the position $POS_{GNSS}(t)$ in the weather analysis data $AN_{DAT}$ or in the weather prognosis data $PROG_{DAT}$, and/or determine a static pressure $p_{AN/PROG}(t)$ related to the altitude $z_{GNSS}(t)$ for the position $POS_{GNSS}(t)$ in the weather analysis data $AN_{DAT}$ or in the weather prognosis data $PROG_{DAT}$, wherein the evaluation unit is furthermore configured to determine an altitude deviation $\Delta z(t)=z_{GNSS}(t)-z_{AN/PROG}(t)$ and/or a pressure deviation $\Delta p(t)=p_{AC}(t)-p_{AN/PROG}(t)$, as well as configured to determine an altitude deviation $\Delta z^*$ averaged over a period $\Delta t$ from $\Delta z(t)=z_{GNSS}(t)-z_{AN/PROG}(t)$ and/or a pressure deviation $\Delta p^*$ over a period $\Delta t$ from $\Delta p(t)=p_{AC}(t)-p_{AN/PROG}(t)$; and a comparator unit to generate a warning signal if a fault of the pressure measuring system is detected, wherein the fault is deemed detected if the comparator unit determines that an absolute value of the averaged altitude deviation $|\Delta z^*|$ is greater than or equal to a specified threshold G1, or if an absolute value of the averaged pressure deviation $|\Delta p^*|$ is greater than or equal to a specified threshold G2.

9. The device according to claim 8, wherein the warning signal generated aboard the flying device triggers an optically, acoustically, and/or haptically perceivable output of the warning signal, and/or the warning signal is transmitted to a ground facility to be processed further and/or to trigger an optically, acoustically, and/or haptically perceivable output of the warning signal there.

10. The device according to claim 8, wherein the geodetic reference system is a WGS84 geodetic reference system with a WGS84 or EGM2008 gravitation model, or the ETRS89 reference system.

11. The device according to claim 8, wherein the satellite navigation system GNSS is a differential satellite navigation system.

12. The device according to claim 8, wherein the pressure measuring system performs an automatic self-calibration of the pressure measuring system when the fault is detected.

13. The device according to claim 12, wherein a determined status STAT(t) of the flying device is taken into account during the automatic self-calibration of the pressure measuring system, wherein the status STAT(t) of the flying device is determined by one or several of following variables: Mach number; angle of attack; yaw angle; roll angle; weight of the flying device; center of gravitation; configuration of the flying device; flap position; and landing gear position.

14. The system according to claim 8, wherein the numerical weather prediction model (NWP):

comprises model pressure surfaces $p_k$, for which initially there are prognosis data $PROG_{RAWDAT}(t)$, and wherein for determining the weather prognosis data $PROG_{DAT}(t)$, the prognosis data $PROG_{RAWDAT}(t)$ are linearly interpolated over time t and linearly interpolated over geographic coordinates and logarithmically interpolated over the pressure field with respect to the position $POS_{GNSS}(t)$ of the flying device between model half-level pressure surfaces $p_{k+1/2}=a_{k+1/2}+b_{k+1/2}*p_{sfc}$, wherein k=0, . . . , K; $p_{k+1/2}=0$ for k=0; $p_{sfc}$: static pressure on the ground for k=K; and $a_{k+1/2}$, $b_{k+1/2}$ are constant coefficients;

takes into account an acceleration due to gravity g depending on the position POS and altitude h; and takes into account a geoid undulation.

15. A flying device comprising a fault determination device to determine a fault of a barometric pressure measuring system arranged aboard the flying device, the barometric pressure measuring system configured to determine a static pressure $p_{AC}(t)$ and/or a barometric altitude $z_{AC}(t)$, the fault determination device comprising:

a processing device; and a non-transitory memory storing instructions that, when executed by the processing device, cause the processing device to perform operations comprising:

determining a position $POS_{GNSS}(t)$ and an altitude $z_{GNSS}(t)$ of the flying device in a geodetic reference system at a point in time t using a satellite navigation system GNSS arranged aboard a flying device;

determining a geopotential altitude $z_{AN/PROG}(t)$ assigned to the static pressure $p_{AC}(t)$ for the position $POS_{GNSS}(t)$ in provided weather analysis data $AN_{DAT}$ or in provided weather prognosis data $PROG_{DAT}$ of a numerical weather prediction model (NWP); and/or determining a static pressure $p_{AN/PROG}(t)$ assigned to the altitude $z_{GNSS}(t)$ for the position $POS_{GNSS}(t)$ in provided weather analysis data $AN_{DAT}$ or in provided weather prognosis data $PROG_{DAT}$ of a numerical weather prediction model (NWP);

determining an altitude deviation $\Delta z(t)=z_{GNSS}(t)-z_{AN/PROG}(t)$ and/or determining a pressure deviation $\Delta p(t)=p_{AC}(t)-p_{AN/PROG}(t)$;

determining an altitude deviation $\Delta z^*$ averaged over a period of time $\Delta t$ from $\Delta z(t)=z_{GNSS}(t)-z_{AN/PROG}(t)$ and/or determining a pressure deviation $\Delta p^*$ averaged over a period of time $\Delta t$ from $\Delta p(t)=p_{AC}(t)-p_{AN/PROG}(t)$; and generating a warning signal if a fault of the barometric pressure measuring system is detected, wherein the fault is deemed detected if an absolute value of the averaged altitude deviation $|\Delta z^*|$ is greater than or equal to a specified threshold G1, or if an absolute value of the averaged pressure deviation $|\Delta p^*|$ is greater than or equal to a specified threshold G2.

16. The flying device according to claim 15, wherein the operations further comprise:

triggering based on the warning signal generated aboard the flying device, an optically, acoustically, and/or haptically perceivable output of the warning signal, and/or transmitting the warning signal to a ground facility to be processed further, and/or triggering an optically, acoustically, and/or haptically perceivable output of the warning signal at the ground facility.

17. The flying device according to claim 15, wherein the geodetic reference system is a WGS84 geodetic reference system with a WGS84 or EGM2008 gravitation model, or the ETRS89 reference system.

18. The flying device according to claim 15, wherein the satellite navigation system GNSS is a differential satellite navigation system.

19. The flying device according to claim 15, wherein the operations further comprise performing an automatic self-calibration of the pressure measuring system when the fault is detected.

20. The flying device according to claim 19, wherein the operations further comprise taking into account a determined status STAT(t) of the flying device during the automatic self-calibration of the pressure measuring system, wherein the status STAT(t) of the flying device is determined by one or several of following variables: Mach number; angle of attack; yaw angle; roll angle; weight of the flying device; center of gravitation; configuration of the flying device; flap position; and landing gear position.

21. The flying device according to claim 15, wherein the numerical weather prediction model (NWP):

comprises model pressure surfaces $p_k$, for which initially there are prognosis data $PROG_{RAWDAT}(t)$, and wherein for determining the weather prognosis data $PROG_{DAT}(t)$, the prognosis data $PROG_{RAWDAT}(t)$ are linearly interpolated over time t and linearly interpolated over geographic coordinates and logarithmically interpolated over the pressure field with respect to the position $POS_{GNSS}(t)$ of the flying device between model half-level pressure surfaces $p_{k+1/2}=a_{k+1/2}+b_{k+1/2}*p_{sfc}$, wherein k=0, . . . , K; $p_{k+1/2}=0$ for k=0; $p_{sfc}$: static pressure on the ground for k=K; and $a_{k+1/2}$, $b_{k+1/2}$ are constant coefficients;

takes into account an acceleration due to gravity g depending on the position POS and altitude h; and takes into account a geoid undulation.

* * * * *